E. H. RAMELLI.
AUTOMATIC SAFETY CLUTCH.
APPLICATION FILED APR. 8, 1915.

1,169,193.

Patented Jan. 25, 1916.

WITNESSES

INVENTOR
Emile H. Ramelli

UNITED STATES PATENT OFFICE.

EMILE H. RAMELLI, OF NEW ORLEANS, LOUISIANA.

AUTOMATIC SAFETY-CLUTCH.

1,169,193.   Specification of Letters Patent.   Patented Jan. 25, 1916.

Application filed April 8, 1915. Serial No. 20,082.

*To all whom it may concern:*

Be it known that I, EMILE H. RAMELLI, a citizen of the United States, residing at New Orleans, in the parish of Orleans and State of Louisiana, have invented certain new and useful Improvements in Automatic Safety-Clutches, of which the following is a specification.

My invention relates to automatic safety clutches for use in driving the tool operated by a dental engine, or generally where it is desired to rotatably connect one member to another so that the drive will yield when a given torque is exceeded, or when the tool or driven member of the clutch meets a greater resistance than normal.

One embodiment of my invention is illustrated in the accompanying drawings in which—

Figure 1:
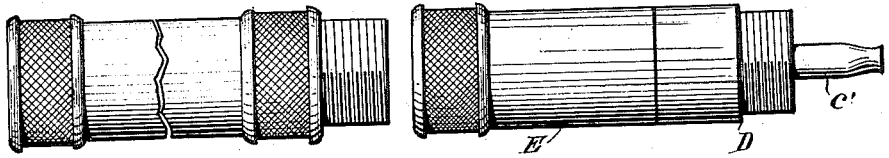
Figure 2:
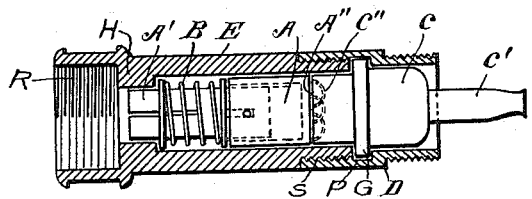
Figure 3:
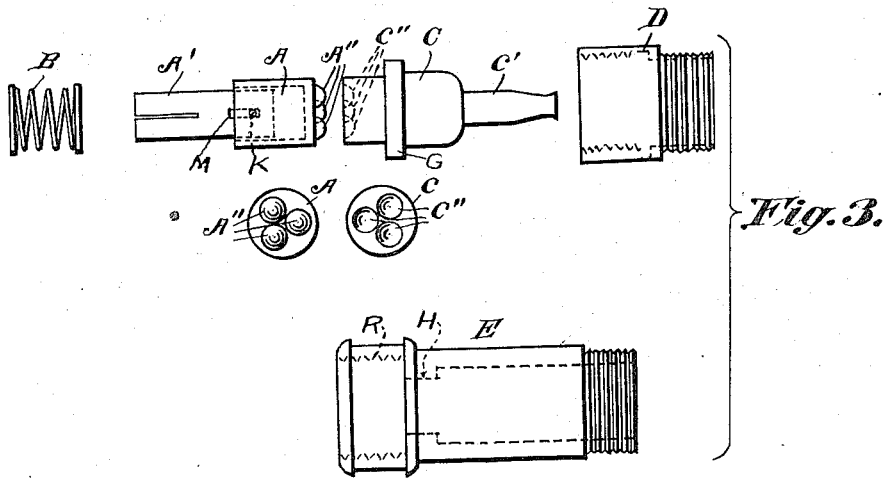

Figure 1 is a side view of my device. Fig. 2 is a longitudinal sectional view through the casing and showing the clutch. Fig. 3 designates detailed views of the separate parts of the clutch.

In the drawings in which like reference characters designate the same part in the different views, E and D indicate a casing in which the clutch members are housed. As shown the two members are connected by a threaded joint S, and the reduced bore of the member D is axially spaced from the bore of member E, thereby forming an annular groove P. At the other end, casing member E is counterbored and internally threaded as at R, and between the threaded portion and the smaller bore, a flange H is formed.

The member C is formed with a peripheral flange G which seats in the groove P. This member is rotatable in the casing and the flange and groove hold it from axial displacement. One end of member C is reduced and has the extension C' projecting axially outside of the casing. This extension C' is adapted to be connected to and driven by a flexible shaft, such as is used in dental engines. At the other end member C is formed with a plurality of concave recesses C''. These recesses are shown as semi-spherical and are equally spaced on a circle concentric with the axis of member C.

A member A is also rotatably mounted in the casing. This member is adapted to be located between the recessed end of member C and the flange H of the casing. It is provided at one end with a plurality of convex projections, preferably semi-spherical, adapted to seat in the recesses in member C. The member is hollow for the greater part of its length and has telescoped in the hollow portion, the cylindrical piece A'. This piece is constrained to rotate with member A, but can move axially relative to the same, by means of the pin and slot connection M and K. The other end of piece A' is adapted to be connected to means for transmitting its rotation to the tool held in the tool holder, connected to casing E.

Surrounding piece A' and interposed between flange H and the end of member A, is a spiral spring. This spring exerts pressure on member A, thereby yieldingly maintaining the projections A'' in the recesses C''.

In the operation of the device the member C is rotated, and by means of the registering projections and recesses A'' and C'', rotation is positively transmitted to piece A' thereby driving the tool or whatever may be connected to A'. If this tool or driven device meets an obstruction or greater resistance than normal, the greater torque required to drive the same will tend to rotate member C relative to member A. The convex projections will then act as cams, forcing the member A away from member C, against the force of spring B. Member C will continue to rotate, and member A will remain stationary, until the obstruction is removed. Spring B will then cause the reengagement of the clutch member A'' and C'' and the drive will be resumed.

My device is of especial advantage in dental engines, for driving the tool. Due to the yielding drive connection, damage to the patient's mouth or operator's hands will be prevented, for instance when the hand piece clogs; or stones in the hand piece catch between teeth; or burs or wheels catch in the rubber dam.

Having already described my invention, I claim:—

A clutch adapted to yield when overloaded, comprising a casing, a rotatable member held against axial movement by the casing, a second member mounted for rotatable and axial movement in the casing, yielding means interposed between the casing and the second member for forcing said second member into engagement with said first member, the contacting portions of said members being provided with coöperating semi-spherical projections and recesses.

March 12 1915.

EMILE H. RAMELLI.

Witnesses:
 BEN. F. MOSES,
 H. E. BELDEN.